United States Patent [19]

Zolman

[11] 4,328,438
[45] * May 4, 1982

[54] HOLDER FOR OVERLOAD PROTECTOR

[75] Inventor: Charles T. Zolman, Zeeland, Mich.

[73] Assignee: General Electric Company, Fort Wayne, Ind.

[ * ] Notice: The portion of the term of this patent subsequent to Jun. 3, 1997, has been disclaimed.

[21] Appl. No.: 140,964

[22] Filed: Apr. 17, 1980

Related U.S. Application Data

[62] Division of Ser. No. 347,073, Apr. 2, 1973, Pat. No. 4,250,419.

[51] Int. Cl.³ .................. H02K 11/00; H01B 17/00
[52] U.S. Cl. .......................... 310/68 R; 174/138 F; 310/71
[58] Field of Search ............... 310/68 R, 71; 174/138 F; 2/340; 229/25, 36, DIG. 8

[56] References Cited

U.S. PATENT DOCUMENTS

| | | |
|---|---|---|
| Re. 26,788 | 2/1970 | Hull . |
| 2,909,719 | 10/1959 | Dubberly . |
| 3,131,322 | 4/1964 | Pleiss, Jr. et al. |
| 3,490,143 | 1/1970 | Hull . |
| 3,659,337 | 5/1972 | Gawthrop et al. |

Primary Examiner—Robert J. Hickey
Attorney, Agent, or Firm—Ralph E. Krisher, Jr.

[57] ABSTRACT

Protector accommodating pocket established by a sheet of dielectric material which is folded upon itself. Includes locking flap having an accurately located entry hole for spade type terminal. Locking shoulder is established by the flap to securely lock a protector in the pocket. A solid segment, interrupted only by a lanced portion provides maximum strength against inadvertent release of the terminal. The assembled member preferably is ultrasonically spot welded and may include a reinforcing member.

4 Claims, 7 Drawing Figures

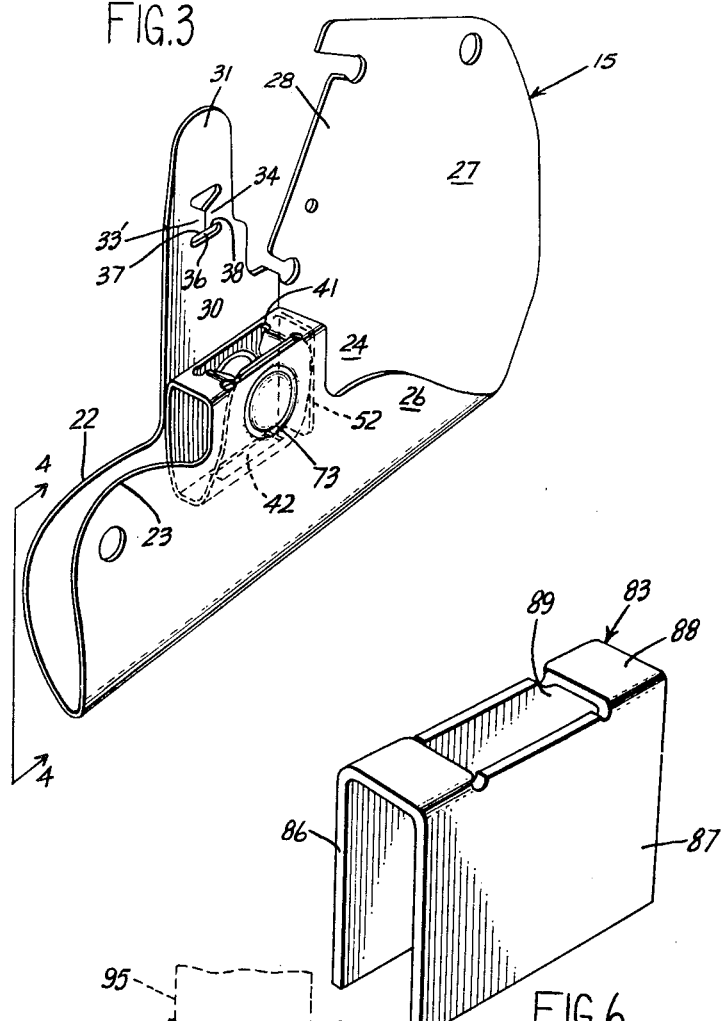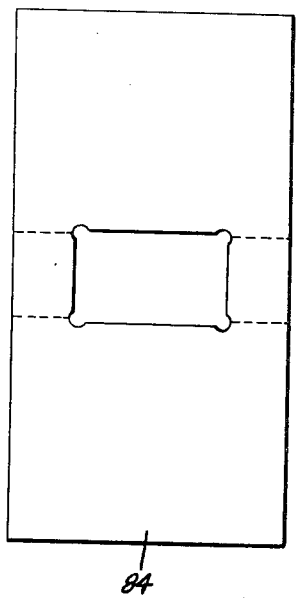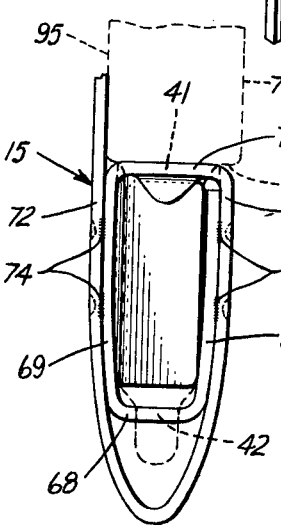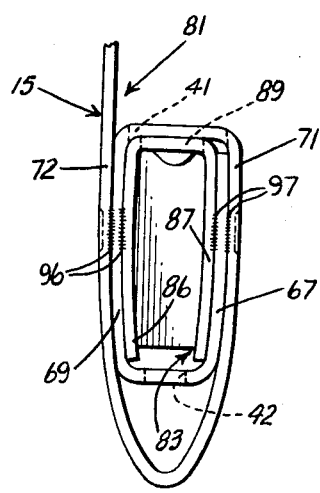

HOLDER FOR OVERLOAD PROTECTOR

CROSS REFERENCE TO RELATED APPLICATIONS

This application is a division of my copending application Ser. No. 347,073, filed Apr. 2, 1973 and which issued as U.S. Pat. No. 4,250,419 on Feb. 10, 1981. The entire disclosure of said application is incorporated herein by reference.

BACKGROUND OF THE INVENTION

The present invention relates to a holder for thermoresponsive means; and more particularly, to a fabricated member adapted to be disposed in intimate relationship with windings of a dynamoelectric machine, and to dynamoelectric machines including a fabricated member that is especially adapted to accommodate devices of the type generally referred to as motor overload protectors.

There has been extensive prior work pertaining to mounting arrangements for thermoresponsive devices such as overload protectors for motors. For example, Dubberley U.S. Pat. No. 2,909,719 illustrates a metal strip or fin in heat exchange contact with the casing of a thermally responsive switch. Dubberly's metal strip or fin preferably is placed between overlapping or adjacent portions of first and second motor windings. This patent also teaches that thin dielectric sheet material may be provided between the metal strip or fin and winding portions adjacent thereto for electrical insulation purposes.

Pleiss, Jr., et al U.S. Pat. No. 3,131,322 (which issued Apr. 28, 1964) illustrates still another approach for disposing overload protector means in heat transfer relationship with the end turns of a motor winding. With this approach, an overload protector is accommodated in a pocket formed by a V-shaped piece of metal foil. The metal foil in turn, is disposed between adjacent winding portions, with a V-shaped insulator (formed e.g., of cellulose acetate, or MYLAR material), separating the metal foil and the winding portions adjacent thereto.

With subsequent development of the motor protector mounting art, it has been suggested that economies in the manufacture of motor stators could be accomplished by eliminating the metal foil pocket members used before, and rely instead upon dielectric sheet material to establish a pocket for a motor protector. In order to eliminate the requirement that the motor protector be tied in place in the pocket established therefore; it has also been suggested to provide a dielectric material that could be used to lock against a spade type terminal of such protector. This tab then could be relied upon to hold the protector in place.

One variation from the above is to include a dielectric material flap that is folded and positioned to establish a layer of dielectric material between the stator winding and the interconnected portions of windings and external conductors. This dielectric material flap is now of a size and shape to permit it to be folded back over such interconnected portions. Cord or twine may then be tied about the folded over flap. With this arrangement, the flap then also provides extra protection against pulling the lead wires loose from the stator windings.

Heretofore, means such as lacing or tying cord have been relied upon to hold external lead wires in a desired position relative to the winding turns and separate sheets of dielectric material have been used to provide the desired insulation between conductor connections and winding end turns.

I have found that the various approaches suggested by others as described above have certain shortcomings. Accordingly, I have devised a new and improved arrangement that is economical to manufacture, and yet is believed to be extremely reliable in practice.

For example, locking tabs provided previously have not always securely locked a protector in place and, in at least some instances, the location of entry and or locking apertures have not always been precisely located so as to properly lock a protector in place.

Accordingly, a general object of the present invention is to provide an improved protector receptacle having an improved locking flap arrangement so that the advantages of quick assembly and precision location may be obtained and yet maximum locking strength also be established and maintained.

SUMMARY OF THE INVENTION

In carrying out the above and other objects of the invention, in one form thereof, I provide a dynamoelectric machine having a protector accommodating pocket that is established by a sheet of dielectric material which is folded upon itself. In a preferred form, the pocket forming dielectric material includes a locking flap having an accurately located entry hole through which a spade type terminal of a protector may enter. A locking shoulder is established by the flap, by means of which the protector may be securely and reliably locked in the pocket. The locking flap entry and locking openings are separated by a substantially solid segment of dielectric material, and the continuity of such solid segment is interrupted by a lanced portion that yields during locking of the flap over the protector terminal, yet provides maximum strength against inadvertent release of the terminal. Particularly contoured protector receiving openings, flaps along preselected portions of such openings, and smooth fold inducing openings, among other things, also are provided.

In another illustrated structure embodying the invention, I have provided a dielectric material reinforcing member that may be folded within the sheet which forms the protector pocket. The fabricated protector receiving pocket is held in assembled relationship preferably by means of ultrasonically welded regions. The ultrasonic welding approach also, preferably, is utilized when a reinforcing member is included.

The subject matter which I regard as my invention is particularly pointed out and distinctly claimed in the concluding portion of this specification. The invention, itself, however, both as to its organization and method of operation, together with further objects and advantages thereof may be better understood by reference to the following description taken in connection with the accompanying drawings.

BRIEF DESCRIPTION OF THE DRAWINGS

FIG. 1 also showing an exemplary overload protector positioned for entry into the pocket of such member of dielectric material;

FIG. 3 is a view in perspective of the pocket forming member of FIG. 1;

FIG. 4 is an end view, with parts broken away and parts removed, of the member shown in FIG. 3, FIG. 4 being a view taken in the direction of the arrows 4—4 in FIG. 3, and also showing, in phantom, parts of an assembly fixture;

FIG. 5 is a view of a sheet material blank used to form a secondary or reinforcing member;

FIG. 6 is a view in perspective of a reinforcing member formed from the blank shown in FIG. 5; and FIG. 7 is an end view generally corresponding to FIG. 4 but showing an assembly of a pocket forming member substantially identical to the one of FIG. 3, and the reinforcing member shown in FIG. 6.

DESCRIPTION OF THE PREFERRED EMBODIMENTS

Figure 1:
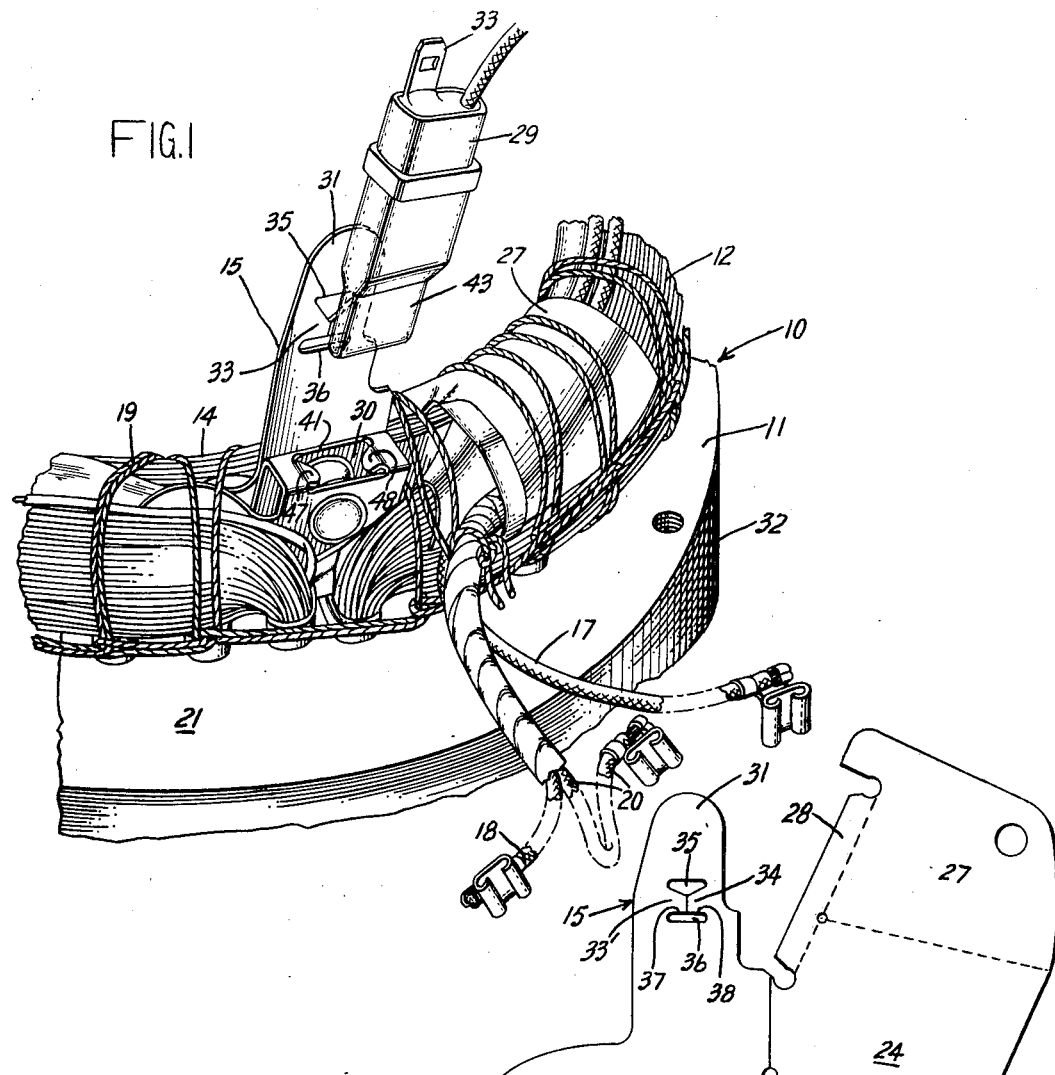
FIG. 1 is a perspective view, with parts removed and parts broken away, of a wound stator assembly that includes an overload protector pocket defining member and embodying the invention in one form thereof.

Turning now to the drawings, I have there illustrated a stator assembly 10 of the type particularly adapted for use in hermetically sealed compressor units. More specifically, the assembly 10 includes a core 11, main windings 12, auxiliary windings 14, a protector pocket establishing member 15, and external lead wires 17, 18, and 20. It will be seen in FIG. 1 that the end turn portions of the windings are bound or tied together with cord. The actual tying or placing of cord 19 may be done with lacing equipment of the type shown and described, for example, in Mason U.S. Pat. No. 3,659,337 which issued May 2, 1972.

During manufacture of the stator assembly 10 (prior to tying the winding end turns), the pocket defining member 15 (see FIG. 3) is slipped into place between the end turn bundles of the windings 12, 14. This may be accomplished by positioning the member 15 above the windings and then manually pushing the member 15 downwardly between the windings toward the face 21 of the core. If desired, a thin blunt tool (for example, a thin steel blade) may be pushed between the two flat portions 22, 23 and 24, 26 of the member 15 (see FIG. 3). In this manner, the member 15 may be seated in a desired position relative to the windings 12 and 14.

Thereafter, a flap 27 (as will be described in more detail hereinafter) is pulled up and over connections between the lead wires 17, 18, and 20. Then, the cord 19 is laced around the end turns and flap 27 to tightly bind together the winding end turns, pocket establishing member 15, and other structural components all as is clearly revealed in FIG. 1 of the drawings.

Subsequently, a thermal protector such as the one denoted by the numeral 29 is pushed into the pocket 30, and locking flap 31 is pulled outwardly away from the bore of the stator core towards the outer surface 32 thereof so that the spade type terminal 40 of protector 29 enters opening 35 of the locking flap or tab 31. A slight pull or tug on flap 31 then will cause the locking ears 40, 34 (see FIG. 3) to separate along, the lanced portions thereof so that the locking ears 34 then prevent inadvertent release of the terminal 40 by flap or tab 31.

Figure 2:
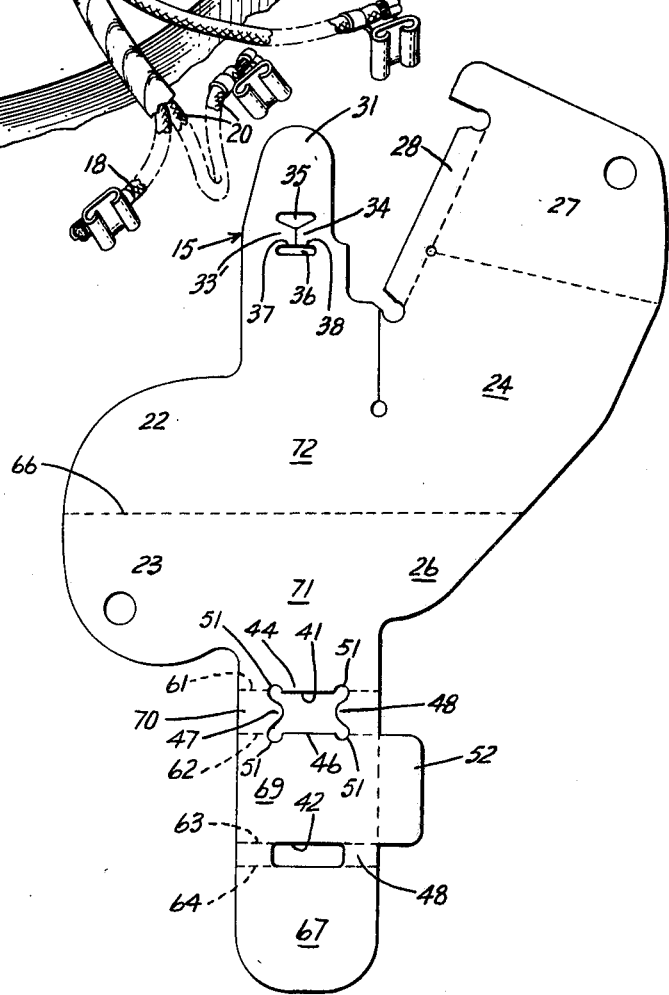
FIG. 2 is a layout of a sheet material blank used to fabricate the pocket forming member of FIG. 1.

Turning now to FIGS. 2 and 3, the pocket establishing member 15 will be described in more detail. It will be understood that numerous different types of dielectric sheet material could be used to form the member 15. For example, any suitable commonly used electrical insulating paper could be used. By way of specific example, nylon paper, one commercial form of which is marketed under the name NOMEX, could be used. Another suitable material (and one that I have used to fabricate members 15) is a laminated sheet of polyester materials which is marketed by E. I. du Pont de Nemours & Co. as D-M-D (Dacron-Mylar-Dacron) mat or sheet. The D-M-D material is a laminate of Du Pont's Dacron and Mylar materials. In fabricating member 15, I used eleven (11) mil thick sheet material which comprised a five (5) mil thick center layer of Mylar material sandwiched or laminated between two three (3) mil outer layers of Dacron material.

Member 15, shown best in FIG. 3, is fabricated from a dielectric sheet material blank that is best shown in FIG. 2. The blank is provided with a first flap having a pair of openings therein, the openings being denoted by the numerals 41 and 42, respectively. Opening 41 establishes an entry opening for the leading end 43 of a protector such as the one illustrated in FIG. 1. After the first flap is folded (see FIG. 3), opening 42 underlies opening 41 and is aligned therewith. The web of material which separates openings 41 and 42 is secured (as will be more fully described hereinafter), to the folded body of the blank so as to maintain alignment of holes 41 and 42 (see FIGS. 3 and 4).

Referring now again to FIG. 1, the leading end 43 of the protector 29 is admitted through entry opening 41 and positioned so that the protector end 43 will project through opening 42. Locking flap 31 then may be pulled down over the protector so as to latch or lock terminal 40 in the locking opening 36.

Entry opening 41 is defined by relative straight edges 44, 46 and also by surfaces of entry flaps 47, 48. Entry flaps 47, 47 flex or yield when a protector is placed in the pocket 30. The flaps 47, 48 provide an increased bearing surface against which the protector body will bear. This prevents cracking or tearing of the sheet material when forces are applied which tend to rock the protector sideways against the flaps 47, 48. These flaps also yield to promote entry of a protector into pocket 30 and yet snugly support a protector that is positioned in the pocket. It will be understood that entry flaps 47, 48, tend to spring toward their unfolded position (as shown in FIG. 2 for example) and thus will provide a centering effect on a protector within pocket 30. Thus, the entry flaps insure that a protector will be held in the pocket with a snug but nonetheless slip fit. It will be appreciated, that if means such as entry flaps 47, 48 were utilized, and opening 41 was precisely dimensioned to provide a snug fit for a protector having a nominal size, one given protector might fit so tightly as to crack or break the material around hole 41.

Undercut corners 51 further protect against breaking or cracking of sheet material around hole 41 when a protector is forced thereinto as well as after final positioning of a protector in pocket 30.

Dotted or dashed lines have been applied to the blank shown in FIG. 2 to represent lines along which the blank is folded during fabrication of member 15. Dotted lines have not been applied for this purpose in FIG. 3, because phantom lines are used in FIG. 3 only to illustrate the location of opening 42, closure flap 52, and other details of member 15 that otherwise are hidden from view in FIG. 3.

With brief reference to FIG. 1 and 3, a pocket closure flap 52 prevents inadvertent or undesired contact between one or more segments of the windings with the body of the protector 29.

In the fabrication of members such as the illustrated member 15, it is convenient to use a fixture having a shape that at least roughly corresponds to the shape of the protector 29. Such fixture is inserted partway into the opening 41 of the blank shown in FIG. 2. The blank then is folded along lines 61, 62; and along the fold lines 63, 64 so that opening 42 is aligned with the free extremity of the assembly fixture. At that time, I effect relative movement between the fixture and the partly folded blank (for example by sliding the blank along the fixture until the free end of the fixture protrudes through the opening 42); and then fold the blank along the fold line 66. At this point in the assembly sequence, the relative positions of the segment or web 69 and segments 67, 68, 70, 71, and 72 of the member 15 will be generally as shown in FIG. 4.

In FIG. 4, I have illustrated, with phantom lines, a portion of an assembly fixture 75 in the position thereof relative to member 15 that will exist after the member 15 has been fabricated. It will be understood that the free end of the fixture 75 may be inserted through opening 41 or that the blank may, itself, be moved onto the fixture. It is convenient for the fixture 75 to be utilized as part of an ultrasonic welding set-up while the member 15 is welded together in the regions 73, 74.

The accurate final alignment and position of locking hole 36 relative to the pocket 30 in member 15 is relatively difficult to maintain. However, the maintenance of a predetermined dimensioned relationship between the pocket and hole 36 is extremely important. After a protector has been inserted into pocket 30, it is necessary that entry means, such as a lanced region, slit, or hole 35 readily accept a protector terminal and that the location of locking opening 36 relative to the terminal be such that the terminal is reliably locked in place in pocket 30.

I can precisely locate locking hole 36 relative to pocket 30 by providing one or more pins on fixture 75. Hole 36 in the locking flap 31 then is positioned over such pins prior to welding the member 15. For example, with a fixture 75 contoured to at least approximately correspond to the shape and configuration of a protector, the fixture is positioned between the section 67 and web or section 69 of member 15 (see FIG. 4). The entry opening 35 or locking opening 36 may be held in position by one or more pins that protrude from the face 95 of the fixture 75 while segment 70 of the blank is held against a shoulder 76 of the fixture 75. This predetermined location of the locking opening is then permanently established when the member 15 is welded at the regions 73 and 74.

After regions 73 and 74 have been ultrasonically welded, flap 31 is removed from the locating means on the fixture, the assembled member 15 is separated from the fixture, and it may then be inserted between windings 12 and 14 (see FIG. 1).

Member 15 may be ultrasonically welded first on one side and then on the other side. This may be done, for example, by welding the region 73 against the fixture 75; and then repositioning the fixture and a welding tip that is powered by a conventional, commercially available, ultrasonic welding power supply. It is to be specifically noted that both sides of the device 15 may be welded substantially simultaneously so as to effect a substantial savings in time. However, when this is done, I have found it to be more preferable to use a different type of weld than that represented at regions 73 and 74.

Regions 73 and 74 represent welds that were made using a cylindrical welding tool that had a welding diameter of approximately 7/16ths of an inch. The welding tool had a non-solid welding tip so that a circular weld bead of about 7/16ths of an inch in diameter was formed. I have found, that if this type of weld is used, it is necessary to utilize substantial amounts of excitation energy for the welding tips in order to perform the welding operation. Moreover, I have found that at least about five seconds actual welding time is required to form each of the welds 73 and 74 in the 3-5-3 D-M-D material. In addition, a conventional power supply that I used had capacity to power only one such welding tip at a time.

However, when I used a solid welding tip formed from one-quarter inch round solid rod, the same power supply could energize two solid welding tips at the same time, and simultaneously accomplish both welds within about one second. Thus, by using the simultaneous solid spot welding approach, I can weld both sides of the member simultaneously in about one second and use only approximately the same total energy that previously was used. By welding both sides simultaneously, I also reduce the total fabrication time by eliminating the need to physically reorient a fixture and welding head so as to sequentially weld first region 73 and then region 74.

As has been indicated above, the member 15 is formed of a laminated material having a total thickness of about 11 mils. It therefore will be appreciated, when viewing FIG. 4, that the sides of a thermoprotector disposed against the portions 67 and 69 of member 15 will be separated from motor windings by two layers of dielectric material (e.g., layers 67 and 71 on one side, and layers 69 and 72 on the other side). Since the material from which member 15 is made is a total of 11 mils thick, this will provide a total thickness of about 22 mils of material separating a protector from windings adjacent thereto.

For some applications however, it is desirable for an even greater thickness of material to separate the protector from the windings. One solution for this would be to use a thicker sheet of dielectric material. For example, a three-ten-three D-M-D mat (meaning a three mil, ten mil, three mil, laminated layer of Dacron-Mylar-Dacron materials) could be used. Then, when such thicker material were folded into the configuration represented by FIGS. 3 and 4, a total thickness of 32 mils of dielectric material would separate a protector from windings adjacent thereto. However, 3-10-3 mil D-M-D material have a total thickness of 16 mils, and are much less readily worked than the material from which member 15 is formed. Of course, such substantially thicker material also is more expensive.

By utilizing structures as illustrated in FIG. 5, I can provide a member corresponding generally (with variations as will now be described) to the structure 15 and yet that will provide an increased amount of dielectric separation between a protector and windings adjacent thereto. The member 81 of FIG. 7 is formed of the same material as the member 15 of FIG. 3. In fact, member 81 includes essentially two parts; a first part being a pocket forming member 15 which, before being folded, corresponds identically to the unfolded blank shown in FIG. 2. However, a secondary member 83 also is used, the secondary member 83 being shown in perspective in FIG. 6.

The member 83 is folded from a blank or flat piece 84 of material that has been shown in its unfolded configuration in FIG. 5 where dotted lines have again been used to represent fold lines. Although blank 84 has been shown to an enlarged scale as compared to FIG. 2, the material blank 84 may actually be salavaged from what otherwise would be a scrap portion of the elongated strip of material from which the blank for member 15 is stamped.

The secondary member 83, once it has been assembled with member 15, will be generally C-shaped and have a pair of legs 86, 87 depending from a bite portion 88. The bite portion has a protector admitting opening 89 formed therein. The legs 86 and 87 provide a reinforcing effect for the sides of the pocket that is established between the sidewalls 67, 71, and 69, 72 of member 15.

It is also to be noted that when the dielectric material is stamped to form the sheets or strips from which the members 15 and the secondary member 83 is formed, it is preferable to crease or score the material along the intended fold lines. This facilitates later folding of the dielectric material during fabrication of the member 15 and 81.

In the actual assembly of a structure as shown in FIG. 7, I have found it most convenient to slip the blank for member 15 onto a welding fixture (e.g., fixture 75). I then slip the blank 84 onto the fixture. Thereafter, I fold the sections 67 and 69 over the fixture, at the same time folding a leg 86 of member 83. I then fold the section 71 and leg 87; and tuck the section 67 between leg 87 of member 83 and section 71 of member 15. As the folding procedure is completed, both pieces of material are slipped completely onto the fixture 75 so as to abut against the locating shoulder 76. At that time, the locking flap 31 of the member 15 is fastened onto latching means, for example as above described, and the substantially solid spot welds 96, 97 are simultaneously completed.

After member 15 or member 81 has been placed between the windings 12, 14, portion 24 is pulled down toward face 21 of core 11 and the interconnected portions of the windings and leads 17, 18, and 20 are laid thereagainst. Portion 27 of the connection covering flap then is folded over such interconnections and laced or tied in place with cord 19.

The entire stator assembly may substantially be shipped to a different location where a protector is positioned in pocket 30. At this time, flap 31 is locked onto the terminal of a protector 29 and a quick connect terminal on one of the winding leads 17, 18, or 20 may be slipped onto a spade terminal of the protector. One or more leads from the protective device may then be used for power connection purposes.

It should be noted that, while an entry hole has been shown, the extent of the lancing (which extends from locking hole 36) could be made greater so as to promote entry of a terminal thereinto. It also should be specifically noted that the assembly 10 may be used wherever desired, but that it may be of particular use in hermetically sealed motor applications. Moreover, since such motors are generally well known in the art, further specific description thereof has not been presented herein. However, an exhaustive description of such motors is presented in B. B. Hull U.S. Pat. Nos. 3,490,143 and Re. 26,788 which issued on Jan. 20 (1970) and Feb. 10 (1970) respectively, and the disclosures of which are specifically incorporated herein by reference.

It should now be appreciated, that the invention described herein may be utilized in practice to reliably and economically overcome the problems mentioned hereinabove and to accomplish the objects set out hereinabove.

Therefore, while in accordance with the Patent Statutes, I have described what at present are considered to be preferred forms of the invention, it will be obvious to those skilled in the art that numerous changes and modifications may be made therein without departing from the true spirit and scope of the invention. It therefore is aimed in the following claims to cover all such modifications.

I claim:

1. A member for establishing a motor protector receiving pocket, said member having at least a portion thereof formed from dielectric sheet material having at least one flap portion having a terminal locking hole formed therein with the terminal locking hole being substantially totally surrounded by dielectric sheet material; a section of said dielectric sheet material immediately adjacent to the terminal locking hole being intact except for being lanced along a line extending from the locking hole without the removal of sheet material from either side of such line; the sheet material immediately adjacent to both sides of the lanced line being yieldable to permit relative movement between a protector terminal and the locking hole along said line; the sheet material adjacent to the locking hole and on each side of said line forming locking ears for retaining a protector terminal trapped in the locking hole.

2. A pocket establishing member for a motor protector, said member comprising at least one flap portion of dielectric sheet material; and a pocket for a motor protector established by shaped dielectric sheet material; said at least one flap portion having a protector terminal locking hole therein; the locking hole being substantially totally surrounded by dielectric sheet material, a section of the sheet material immediately adjacent to the locking hole being intact except for being lanced along a line extending from the locking hole without the removal of sheet material from either side of such line, and the sheet material immediately adjacent to both sides of such line being yieldable to permit relative movement between a protector terminal and the locking hole along the line.

3. In a member for establishing a motor protector receiving pocket, wherein the member is formed from a dielectric sheet material blank having a body portion and at least one flap portion having a protector terminal locking hole therein, and wherein the blank is folded to establish a protector accommodating pocket, the improvement comprising a cut out portion at corners of the member to be subjected to stresses, thereby to provide protection against tearing of the sheet material at such corners.

4. In the member of claim 3, the improvement further comprising: a reinforcing member inserted in the pocket, said reinforcing member being a folded piece of dielectric sheet material.

* * * * *